US009697396B2

(12) United States Patent
Xue

(10) Patent No.: US 9,697,396 B2
(45) Date of Patent: Jul. 4, 2017

(54) INTERACTIVE PROCESSING METHOD AND DEVICE AND ELECTRONIC APPARATUS

(71) Applicant: ZTE CORPORATION, Shenzhen, Guangdong Province (CN)

(72) Inventor: Zitao Xue, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 14/423,909

(22) PCT Filed: Jul. 25, 2013

(86) PCT No.: PCT/CN2013/080143
§ 371 (c)(1),
(2) Date: Feb. 25, 2015

(87) PCT Pub. No.: WO2013/174343
PCT Pub. Date: Nov. 28, 2013

(65) Prior Publication Data
US 2015/0213296 A1 Jul. 30, 2015

(30) Foreign Application Priority Data

Aug. 28, 2012 (CN) .......................... 2012 1 0309959

(51) Int. Cl.
H04Q 5/22 (2006.01)
G06K 7/10 (2006.01)
(Continued)

(52) U.S. Cl.
CPC ......... G06K 7/10366 (2013.01); G06F 3/017 (2013.01); G06F 3/0346 (2013.01);
(Continued)

(58) Field of Classification Search
CPC ................................................ G06K 7/10366
(Continued)

(56) References Cited

U.S. PATENT DOCUMENTS 8,525,676 B2 * 9/2013 Yasui ............... G06K 19/07716
340/10.1
2008/0122581 A1 * 5/2008 Bae ...................... G06K 7/0008
340/10.2
(Continued)

FOREIGN PATENT DOCUMENTS

| CN | 101416412 | 4/2009 |
| CN | 101489197 | 7/2009 |
| CN | 102938051 | 2/2013 |

OTHER PUBLICATIONS

Communication with Supplementary European Search Report mailed Nov. 10, 2015 corresponding to European Patent Application No. EP 13794090.
(Continued)

Primary Examiner — Santiago Garcia
(74) Attorney, Agent, or Firm — McAndrews, Held & Malloy, Ltd.

(57) ABSTRACT

Provided are an interactive processing method and device and an electronic apparatus. The interactive processing method is applied to a first electronic apparatus that supports radio frequency identification (RFID) transmission. The interactive processing method includes: obtaining data to be processed from a peer communication node through an RFID technology; obtaining a first input operation input by a user through an input device; determining a first control instruction corresponding to the first input operation according to a pre-defined first corresponding relation that records a plurality of input operations and corresponding control instructions; and executing the first control instruction, and controlling the first electronic apparatus to process the data to be processed. The solution improves the use flexibility of the RFID in the electronic apparatus.

18 Claims, 4 Drawing Sheets

(51) Int. Cl.
*H04M 1/725* (2006.01)
*G06F 3/0346* (2013.01)
*G06F 3/01* (2006.01)

(52) U.S. Cl.
CPC ...... *H04M 1/7253* (2013.01); *H04M 1/72519* (2013.01); *H04M 2250/04* (2013.01)

(58) Field of Classification Search
USPC .......................................................... 340/10.1
See application file for complete search history.

(56) References Cited

U.S. PATENT DOCUMENTS

| | | | |
|---|---|---|---|
| 2009/0241840 A1* | 10/2009 | Mills .................... | A01K 5/0114 |
| | | | 119/51.02 |
| 2012/0019367 A1* | 1/2012 | Roth ...................... | G08C 17/02 |
| | | | 340/10.6 |
| 2012/0190301 A1* | 7/2012 | Hart .................... | H04M 1/7253 |
| | | | 455/41.2 |
| 2013/0128022 A1* | 5/2013 | Bose ........................ | H04N 7/18 |
| | | | 348/77 |
| 2014/0225735 A1* | 8/2014 | Hosseini ............ | G08B 13/2451 |
| | | | 340/572.1 |
| 2014/0266753 A1* | 9/2014 | Steffen ................ | A47J 37/1295 |
| | | | 340/669 |

OTHER PUBLICATIONS

International Search Report for International Patent Application No. PCT/CN2013/080143 mailed Nov. 7, 2013.

* cited by examiner

INTERACTIVE PROCESSING METHOD AND DEVICE AND ELECTRONIC APPARATUS

CROSS-REFERENCE TO RELATED APPLICATIONS/INCORPORATION BY REFERENCE

This application is a 371 of International Patent Application No. PCT/CN2013/080143, filed Jul. 25, 2013, entitled "INTERACTIVE PROCESSING METHOD AND DEVICE AND ELECTRONIC APPARATUS", which claims priority to Chinese Patent Application No. 201210309959.4, filed Aug. 28, 2012, entitled "INTERACTIVE PROCESSING METHOD AND DEVICE AND ELECTRONIC APPARATUS". The above-identified applications are hereby incorporated herein by reference in their entirety.

TECHNICAL FIELD

The disclosure relates to the radio frequency identification (referred to as RFID) technology, in particular, to an interactive processing method and device and electronic apparatus.

BACKGROUND

The RFID technology is a non-contact automatic identification technology, the fundamental principle of which is to communicate using space electromagnetic induction or electromagnetic propagation so as to achieve the purpose of automatically identifying identified objects.

Typically, the transmitting frequency of an RFID reader is referred to as the working frequency or carrier frequency of the RFID system. The working frequency of the RFID mainly includes 4 ranges:

low frequency (30 kHz-300 kHz);
high frequency (3 MHz-30 MHz)
ultra-high frequency (300 MHz-968 MHz); and
microwave (1 GHz and above)

Now more and more electronic apparatuses start to use the RFID technology, and most of them use two frequency bands: 13.56 MHz (following the frequency band used by IC cards of buses) and 2.4 GHz, in which 13.56 MHz is more widely used, and the range of this frequency is generally at 1 cm-10 cm, and the frequency has various solutions like dual interface cards, Near Field Communication (referred to as NFC), Enhanced Near Field Communication (ENFC), Smart Mobile Application Platform (referred to as SMAP), etc., which are collectively referred to as NFC.

With the acceleration of standard processes and commercial processes of Internet of Things, the application market of NFC is increasingly broad, which gradually penetrates from the mobile enabled types of services of buses and schools into all aspects of life, and the rapid development of intelligent terminals further accelerates the popularization of NFC. Standard organizations and agreements such as the NFC Forum, the European Computer Manufacturers Association (referred to as the ECMA), the European Telecommunication Standard Institution (referred to as ETSI) and the International Standardization Organization (referred to as ISO)/International Electrotechnical Commission (referred to as IEC) standardize NFC and extensively put it into commercial use by multiple operators in respective countries, and are generally recognized as a vanguard for commercial use of Internet of Things.

NFC has three working modes: simulation card mode, reader mode and point-to-point mode, in which the simulation card mode is generally used for systems of mobile payment, checking-in and access control, and so on; the reader mode can be used for reading poster advertising and commodities which are borne with RFD); and the point-to-point mode can be used for data interaction transmission between two terminals that both support the point-to-point mode.

However, the service modes of existing terminals with the RFID function are unitary and are not flexible.

SUMMARY

The embodiments of the disclosure provide an interactive processing method and device and an electronic apparatus, to improve the flexibility of a terminal having the RFID function when using the RFID.

An embodiment of the disclosure provides an interactive processing method used in a first electronic apparatus that supports RFID transmission. The interactive processing method includes:

obtaining data to be processed from a peer communication node through an RFID technology;

obtaining a first input operation input by a user through an input device;

determining a first control instruction corresponding to the first input operation according to a pre-defined first corresponding relation that records a plurality of input operations and corresponding control instructions; and executing the first control instruction, and controlling the first electronic apparatus to process the data to be processed.

In an example embodiment of the above-mentioned interactive processing method, the peer communication node is a second electronic apparatus that supports RFID transmission or an RFID label.

In an example embodiment of the above-mentioned interactive processing method, when the peer communication node is the second electronic apparatus that supports RFID transmission, the first input operation includes:

an input operation input by the user through an input device on the first electronic apparatus; and/or an input operation input by the user through an input device on the second electronic apparatus and received from the second electronic apparatus through the RFID technology.

In an example embodiment of the above-mentioned interactive processing method, when the first input operation is the input operation input by the user through the input device on the second electronic apparatus and received from the second electronic apparatus through the RFID technology, the first corresponding relation is a corresponding relation received from the second electronic apparatus through the RFID technology.

Another embodiment of the disclosure further provides an interactive processing method used in a third electronic apparatus that supports RFID transmission. The interactive processing method includes:

receiving a second input operation from a fourth electronic apparatus through an RFID technology, wherein the second input operation is an input operation input by a user through an input device on the fourth electronic apparatus;

determining a second control instruction corresponding to the second input operation according to a pre-defined second corresponding relation that records a plurality of input operations and corresponding control instructions; and executing the second control instruction, and controlling the third electronic apparatus.

In an example embodiment of the above-mentioned interactive processing method, the second corresponding relation is a corresponding relation received from the fourth electronic apparatus through the RFID technology.

Another embodiment of the disclosure further provides an interactive processing device used in a first electronic apparatus that supports RFID transmission, the interactive processing device including:

a data acquisition module configured to obtain data to be processed from a peer communication node through an RFID technology;

an input operation acquisition module configured to obtain a first input operation input by a user through an input device;

a first instruction determination module configured to determine a first control instruction corresponding to the first input operation according to a pre-defined first corresponding relation that records a plurality of input operations and corresponding control instructions; and a first execution module configured to execute the first control instruction and control the first electronic apparatus to process the data to be processed.

In an example embodiment of the above-mentioned interactive processing device, the peer communication node is a second electronic apparatus that supports RFID transmission or an RFID label.

In an example embodiment of the above-mentioned interactive processing device, when the peer communication node is the second electronic apparatus that supports RFID transmission, the first input operation includes:

an input operation input by the user through an input device on the first electronic apparatus; and/or an input operation input by the user through an input device on the second electronic apparatus and received from the second electronic apparatus through the RFID technology.

In an example embodiment of the above-mentioned interactive processing device, when the first input operation is the input operation input by the user through the input device on the second electronic apparatus and received from the second electronic apparatus through the RFID technology, the first corresponding relation is a corresponding relation received from the second electronic apparatus through the RFID technology.

Another embodiment of the disclosure further provides a first electronic apparatus that supports RFID transmission. The first electronic apparatus includes the above-mentioned interactive processing device.

Another embodiment of the disclosure further provides an interactive processing device used in a third electronic apparatus that supports RFID transmission, the interactive processing device including:

a receiving module configured to receive a second input operation from a fourth electronic apparatus through an RFID technology, wherein the second input operation is an input operation input by a user through an input device on the fourth electronic apparatus;

a second instruction determination module configured to determine a second control instruction corresponding to the second input operation according to a pre-defined second corresponding relation that records a plurality of input operations and corresponding control instructions; and a second execution module configured to execute the second control instruction and control the third electronic apparatus.

In an example embodiment of the above-mentioned interactive processing device, the second corresponding relation is a corresponding relation received from the fourth electronic apparatus through the RFID technology.

Another embodiment of the disclosure further provides a third electronic apparatus that supports RFID transmission, the third electronic apparatus including the above-mentioned interactive processing device.

The embodiments of the disclosure have at least one of the following effects.

In the embodiments of the disclosure, by pre-defining a corresponding relation between input operations and control instructions, a first electronic apparatus, after obtaining data to be processed from a peer communication node through the RFID technology, determines a corresponding instruction according to different input operations input by the user, thereby controlling the electronic apparatus to perform corresponding processing on the data to be processed by executing the instruction, and improving the application flexibility of the RFID.

In the embodiments of the disclosure, it is also possible to transmit through a peer electronic apparatus the input operations input by the user, and then a local electronic apparatus determines a corresponding instruction according to different input operations input by the user, so as to control the electronic apparatus by executing the instruction, thereby improving the application flexibility of the RFID.

In the embodiments of the disclosure, other sensors or buttons are used to perform information transfer. By assigning corresponding definitions to the operations of the sensors and buttons, when the user performs a corresponding operation during RFID interaction, the sensors or buttons are used to transfer corresponding self-defined control information in different operation modes, thus opening up the richness of used services or the services of the RFID.

Meanwhile, in the embodiments of the disclosure, as the definitions of the operations are defined in advance, most of the operations are simply hand gestures.

The RFID can carry rich customizable control information, which enriches the corresponding applications of the RFID.

By means of the embodiments of the disclosure, plenty of operation modes that attract users can be worked out, and their development in scenarios like social network site (referred to as SNS) also complies with the development trend of smart phones and the working direction of Internet of Things.

BRIEF DESCRIPTION OF THE DRAWINGS

Drawings, provided for further understanding of the embodiments of the disclosure and forming a part of the specification, are used to explain the disclosure together with embodiments of the disclosure rather than to limit the embodiments of the disclosure. In the drawings.

DETAILED DESCRIPTION OF THE EMBODIMENTS

In the interactive processing method and device and the electronic apparatus of the embodiments of the disclosure, the input device of the electronic apparatus is utilized to assist the processing of the electronic apparatus when the electronic apparatus operates based on the RFID technology, thus improving the use flexibility of the RFID.

Figure 1:
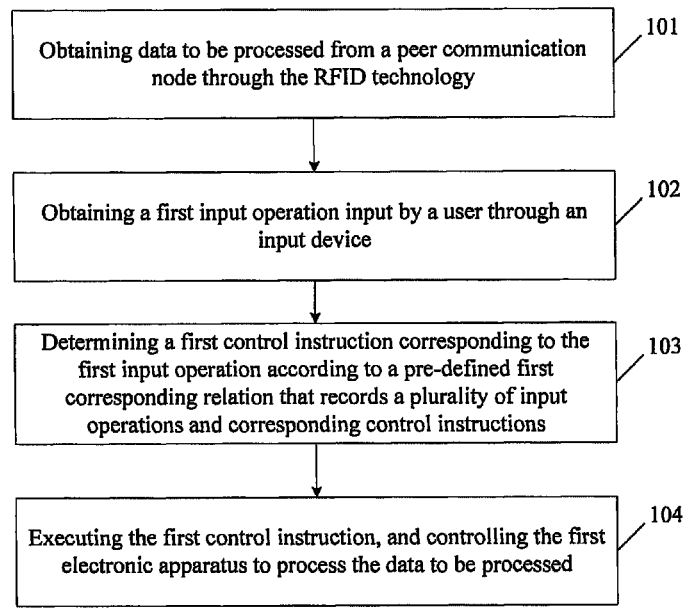
FIG. 1 is a schematic flowchart of an interactive processing method according to an embodiment of the disclosure.

An interactive processing method according to an embodiment of the disclosure, used in a first electronic apparatus that supports RFID transmission, as shown in FIG. 1, includes:

Step 101, obtaining data to be processed from a peer communication node through the RFID technology;

Step 102, obtaining a first input operation input by a user through an input device;

Step 103, determining a first control instruction corresponding to the first input operation according to a pre-defined first corresponding relation that records a plurality of input operations and corresponding control instructions; and Step 104, executing the first control instruction, and controlling the first electronic apparatus to process the data to be processed.

In the interactive processing method of the embodiment of the disclosure, by pre-defining a corresponding relation between input operations and control instructions, the first electronic apparatus, after obtaining data to be processed from a peer communication node through the RFID technology, determines a corresponding instruction according to different input operations input by the user, thereby controlling the electronic apparatus to perform corresponding processing on the data to be processed by executing the instruction.

In an example embodiment of the disclosure, the step of obtaining data to be processed from a peer communication node through the RFID technology may be performed after the user performs the first input operation through an input device. That is, the first input operation of the user performed through the input device may not only activate the transmission of data but also define the subsequent processing, which substantially improves the flexibility with respect to the fixed modes in the related art.

In an example embodiment of the disclosure, the input device may be either a sensor or a sensor and a button.

In an example embodiment of the disclosure, the peer communication node may be either an RFID label or a second electronic apparatus that supports RFID transmission. Illustrations to these contents are respectively made below.

<The Peer Communication Node May be an RFID Label>

When the peer communication node is an RFID label, it is assumed that the content of the label is the name of an electronic product.

Explanations to the above-mentioned working process are as below.

It is assumed that the RFID label saves product information introduction, product official website address, and reservation phone numbers, and so on.

It is assumed that the following corresponding relation is defined in advance:

| Input operation | Instruction |
| --- | --- |
| Swing to the right | Open product official website |
| Swing to the left | Save reservation phone numbers to a phone book |

When a hand-held electronic apparatus of the user swings to the right while approaching an RFID label, the electronic apparatus determines that the electronic apparatus is moving to the right according to the detection result of a displacement sensor, and the electronic apparatus obtains the content of the label (product information introduction, product official website address, reservation phone numbers, etc.) from a peer communication node through the RFID technology, and generates and executes an instruction for opening the product official website address, thereby achieving automatic opening of the product official website through a browser.

When the hand-held electronic apparatus of the user swings to the left while approaching the RFID label, the electronic apparatus determines that the electronic apparatus is moving to the left according to the detection result of the displacement sensor, and the electronic apparatus obtains the content of the label (product information introduction, product official website address, reservation phone numbers, etc.) from the peer communication node through the RFID technology, and generates and executes an instruction for saving reservation phone numbers to a phone book, thereby achieving automatic saving of the reservation phone numbers to the phone book.

It can be found from the above description that by means of the method of the embodiments of the disclosure, different processing can be performed on data content via simple input operations of the user, thus improving the use flexibility of the RFID.

Above is the explanation made with the example of a motion sensor. The embodiments of the disclosure, however, are not limited to a specific type of sensor, and a triaxial gravity sensor, for example, may also be used to implement the disclosure. Below is a brief explanation.

Many existing electronic apparatuses, such as a mobile phone, are able to detect the direction of the apparatuses. For example, when answering a call, turning the phone over to make the front side down may achieve incoming call hangup or muting, etc., and this is the function achieved by the capability of detecting the direction of an apparatus by a triaxial gravity sensor. Therefore, the method of the embodiments of the disclosure may also be implemented by using the detection result of the triaxial gravity sensor.

When the user holds an electronic apparatus in hand, and approaches an RFID label while making sure that the front side of the electronic apparatus is facing upwards, the electronic apparatus determines that the front side of the electronic apparatus is facing upwards according to the detection result of the triaxial gravity sensor, and therefore, after obtaining the content of the label (product information introduction, product official website address, reservation phone numbers, etc.) from a peer communication node through the RFID technology, the electronic apparatus generates and executes an instruction for opening the product official website address, thereby achieving automatic opening of the official website of the product through a browser.

When the user holds the electronic apparatus in hand, and approaches the RFID label while making sure that the front side of the electronic apparatus is facing downwards, the electronic apparatus determines that the front side of the electronic apparatus is facing downwards according to the detection result of the triaxial gravity sensor, and therefore, after obtaining the content of the label (product information introduction, product official website address, reservation phone numbers, etc.) from the peer communication node through the RFID technology, the electronic apparatus generates and executes an instruction for saving reservation phone numbers to a phone book, thereby achieving automatic saving of the reservation phone numbers to the phone book.

<The Peer Communication Node is a Second Electronic Apparatus that Supports RFID Transmission>

This manner only differs from the above-mentioned manner in the peer communication nodes, and there is no essential distinction between the two manners. Here is an explanation made with a simple example.

If an electronic apparatus of user A stores a song and wants to transmit it to user B, when the hand-held electronic apparatus of user B swings to the right while approaching the electronic apparatus of user A, the electronic apparatus will determine that the electronic apparatus is moving to the right according to the detection result of a displacement sensor, and the electronic apparatus of user B will interact with the electronic apparatus of user A through the RFID technology to obtain the song, and generate and execute an instruction for playing the song, thereby achieving automatic play of the song.

When the hand-held electronic apparatus of user B swings to the left while approaching the electronic apparatus of user A, the electronic apparatus will determine that the electronic apparatus is moving to the left according to the detection result of the displacement sensor, and the electronic apparatus of user B will interact with the electronic apparatus of user A through the RFID technology to obtain the song, and generate and execute an instruction for storing the song in a specified location, thereby achieving automatic storage of the song in a predetermination location.

When the above-mentioned peer communication node is a second electronic apparatus that supports RFID transmission, the first input operation may be an input operation of the user performed through an input device on a first electronic apparatus, which is already illustrated above.

However, the first input operation may also be an input operation of the user performed through an input device on a second electronic apparatus, which is received from the second electronic apparatus through the RFID technology.

This kind of scenario is illustrated as below.

If an electronic apparatus of user A stores a song and wants to transmit it to user B, when the hand-held electronic apparatus of user A swings to the right while approaching the electronic apparatus of user B, the electronic apparatus of user A will send content of a song and an input operation of user A (moving to the right) to the electronic apparatus of user B through the RFID technology; and after obtaining the content of the song and the input operation of user A, user B will query a corresponding relation between input operations and instructions saved by itself, and generate and execute an instruction for playing the song according to the input operation of user A, thereby achieving automatic play of the song.

In this manner, a data source, instead of a receiving end, may be used to decide the way for processing the data.

In the above-mentioned examples, the first corresponding relation that records a plurality of input operations and corresponding control instructions is stored in the first electronic apparatus.

In an example embodiment of the disclosure, however, the above-mentioned first input operation may also be an input operation of the user performed through an input device on the second electronic apparatus, which is received from the second electronic apparatus through the RFID technology, and in this case, the above-mentioned first corresponding relation is a corresponding relation received from the second electronic apparatus through the RFID technology.

In this manner, when the corresponding relations of two electronic apparatuses have the same settings, the first electronic apparatus may determine and execute a control instruction according to any one of the corresponding relations.

While when the corresponding relations of two electronic apparatuses have different settings, the first electronic apparatus will determine and execute a control instruction according to the first corresponding relation that records input operations and corresponding control instructions.

The above-mentioned manner further improves the flexibility.

In the above-mentioned implementation, after obtaining data to be processed from the peer communication node, the first electronic apparatus performs corresponding processing on the data to be processed according to the operation of the user on the first electronic apparatus or the operation on the second electronic apparatus.

However, the method of the embodiments of the disclosure may also be used for other controls of an electronic apparatus.

Figure 2:
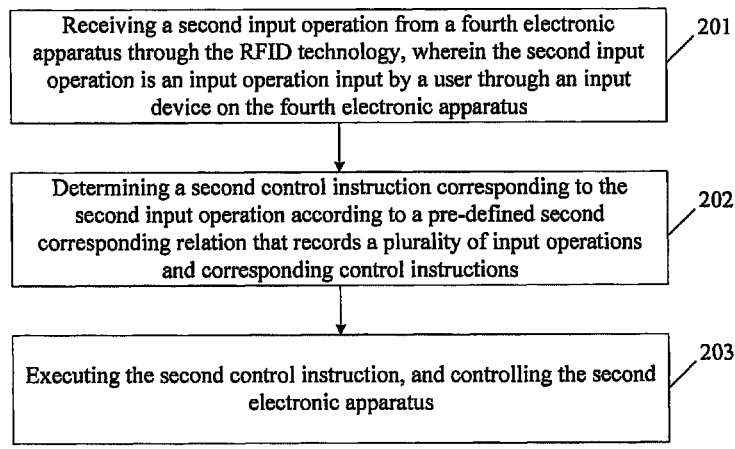
FIG. 2 is a schematic flowchart of another interactive processing method according to an embodiment of the disclosure.

An interactive processing method of another embodiment of the disclosure, used in a third electronic apparatus that supports RFID transmission, as shown in FIG. 2, includes:

step 201, receiving a second input operation from a fourth electronic apparatus through the RFID technology, wherein the second input operation is an input operation input by a user through an input device on the fourth electronic apparatus;

step 202, determining a second control instruction corresponding to the second input operation according to a pre-defined second corresponding relation that records a plurality of input operations and corresponding control instructions; and step 203, executing the second control instruction, and controlling the third electronic apparatus.

In the interactive processing method of another embodiment of the disclosure, the peer electronic apparatus is able to transmit to the third electronic apparatus the operation of the user performed on the peer electronic apparatus to control the third electronic apparatus, which improves the application flexibility of the RFID.

It is certain that in an example embodiment of the disclosure, the above-mentioned second corresponding relation may be either a corresponding relation saved in the third electronic apparatus or a corresponding relation received from the fourth electronic apparatus through the RFID technology.

Illustration is made below to the above-mentioned example.

It is assumed that the second corresponding relation is as follows:

| Input operation | Instruction |
| --- | --- |
| Swing to the right | Establish a Wireless Fidelity (referred to as Wi-Fi) link |
| Swing to the left | Transmit a name card of the present electronic apparatus to the peer communication node through the RFID |

When the hand-held electronic apparatus of user A swings to the right while approaching the electronic apparatus of user B, the electronic apparatus of user A will send an input operation of user A (moving to the right) to the electronic apparatus of user B through the RFID technology; and after obtaining the input operation, the electronic apparatus of user B will query a second corresponding relation between input operations and instructions, and establish a WiFi link with the electronic apparatus of user A according to the input operation of user A.

When the hand-held electronic apparatus of user A swings to the left while approaching the electronic apparatus of user B, the electronic apparatus of user A will send an input operation of user A (moving to the left) to the electronic apparatus of user B through the RFID technology; and after obtaining the input operation, the electronic apparatus of user B will query a second corresponding relation between input operations and instructions, and obtain the name card of its own according to the input operation of user A and transmit same to the electronic apparatus of user A through the RFID.

When the second corresponding relation is a corresponding relation received from the second electronic apparatus through the RFID technology, the difference thereof only lies in that the electronic apparatus of user A also transmits the corresponding relation at the same time the input operation is transmitted, while the electronic apparatus of user B determines an instruction according to the received corresponding relation.

An example in which an electronic apparatus is a cell phone is taken below to describe in detail several example applications of the method of the embodiments of the disclosure.

Figure 3:
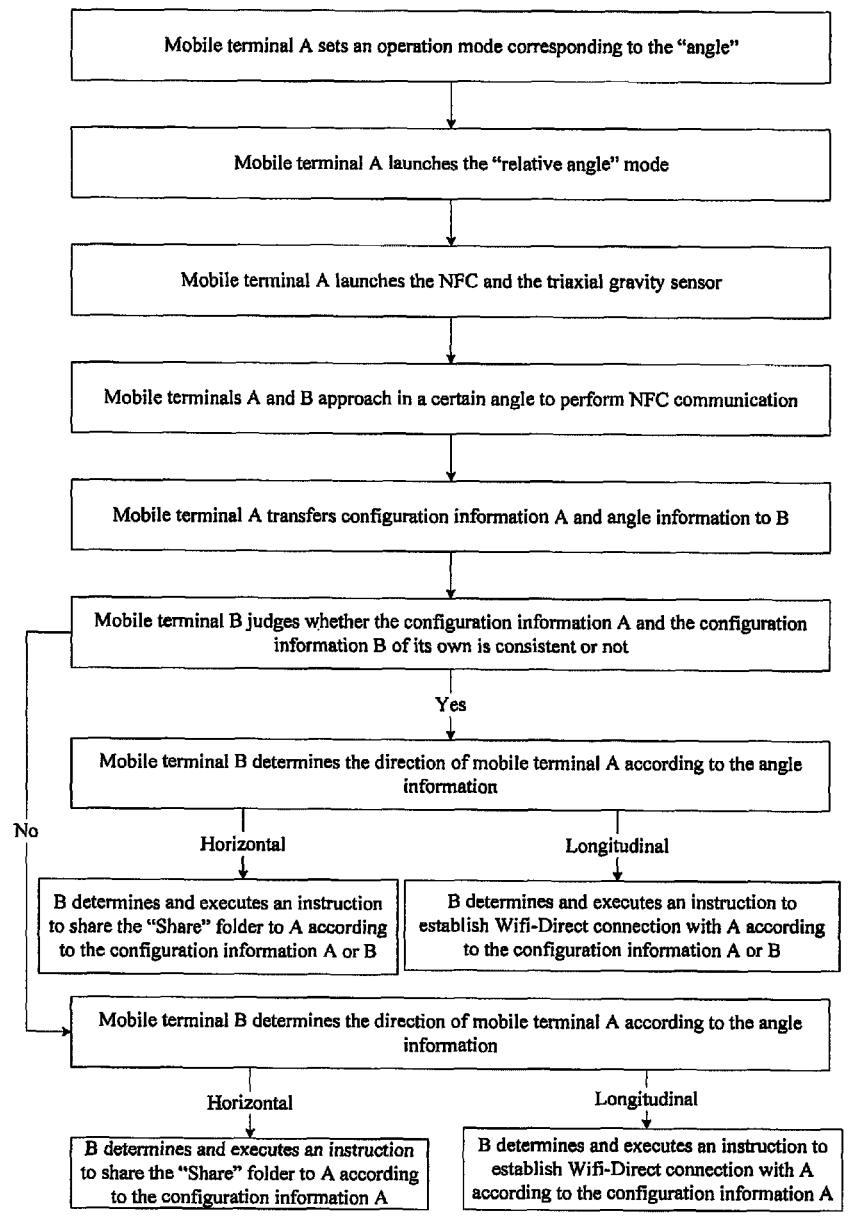
FIG. 3 is a schematic flowchart of the interactive processing method according to an embodiment of the disclosure.

FIG. 3 is an example schematic flowchart of applying the method of an embodiment of the disclosure in the point-to-point mode, including:

mobile terminal A first needs to set operation modes corresponding to different "angles", and both the relative angle mode and the absolute angle mode need to respectively perform specific settings;

meanwhile, the user may choose the relative angle mode or the absolute angle mode. The content of the configuration includes: the terminals can be of the same default configuration, the ID of the configuration is determined as Config_Default (default configuration); the default configuration includes: in the absolute angle mode, when terminal A is horizontal and approaches terminal B, it means that a folder named "Share" in the root directory of terminal A is completely shared to terminal B; and when terminal A is longitudinal, it means that terminal B can directly perform wife-direct (Wireless Fidelity) connection with terminal A; and it is certain that specific configuration in the relative angle can also be defined, while the defined configuration has its own configuration ID Config.

After terminal A chooses the absolute angle mode, terminal A will launch the NFC and the triaxial gravity sensor;

when terminal A and terminal B perform NFC communication in a certain angle, terminal A transfers the angle and configuration information thereof to terminal B in the process of NFC contact;

after receiving the angle and configuration information, terminal B first determines the configuration version information. If the configuration files are the same, the direction of terminal A is further determined according to the angle information. When it is determined that terminal A is horizontal, an instruction will be determined and executed to share the "Share" folder to terminal A; and when terminal A is longitudinal, an instruction will be determined and executed to establish wifi-direct connection with terminal A;

if the configuration files are different, after completing angle determination, terminal B completes subsequent processing according to the configuration information transferred by terminal A, and the processing modes thereof are identical and will not be described again here.

What is described above is an explanation made to the absolute angle mode, and below is a description of the relative angle mode.

Figure 4:
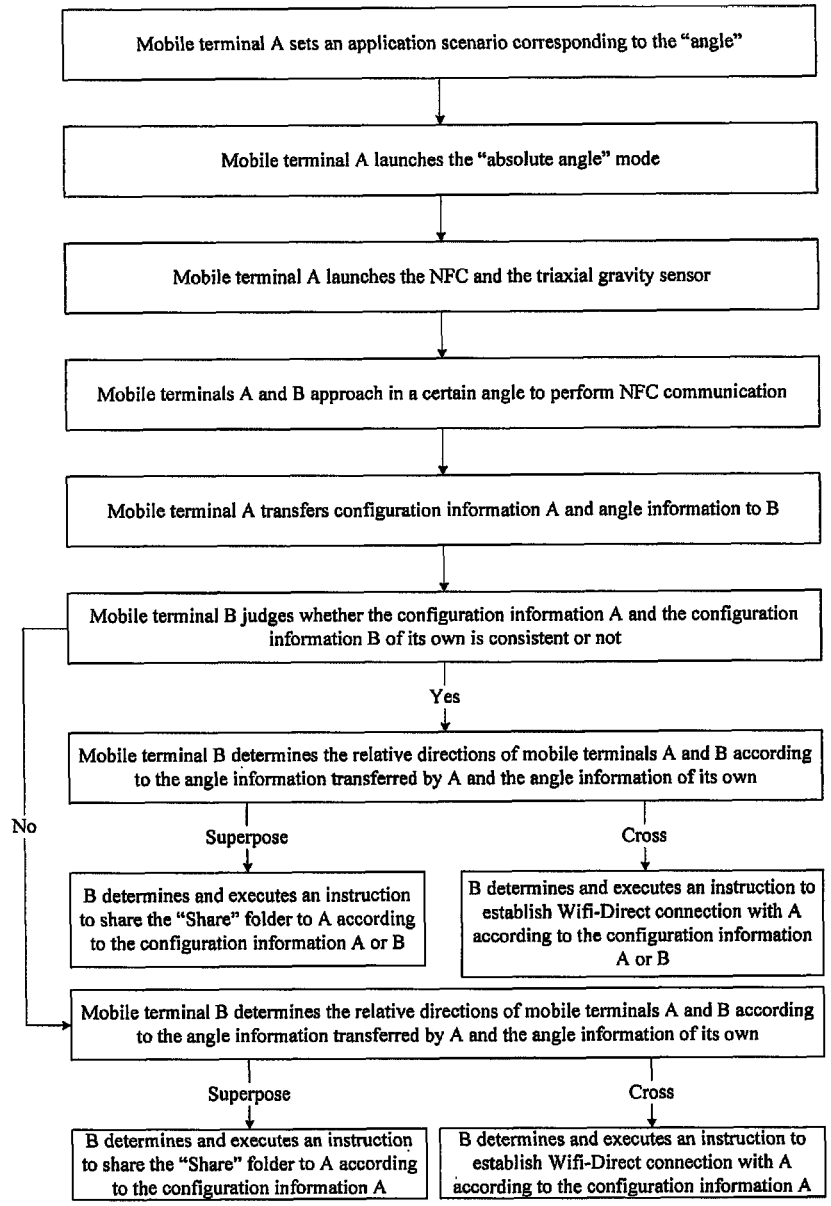
FIG. 4 is a schematic flowchart of the interactive processing method according to another embodiment of the disclosure.

FIG. 4 is another example schematic flowchart of the method of the embodiments of the disclosure, including:

mobile terminal A first needs to set operation modes corresponding to different "angles", and both the relative angle mode and the absolute angle mode need to respectively perform specific settings;

meanwhile, the user may choose the relative angle mode or the absolute angle mode. The content of the configuration includes: the terminals can be of the same default configuration, and the ID of the configuration is determined as Config_Default; the default configuration includes: in the absolute angle mode, when terminal A is horizontal and approaches terminal B, it means that a folder named "Share" in the root directory of terminal A is completely shared to terminal B; and when terminal A is longitudinal, it means that terminal B can directly perform wifi-direct (Wireless Fidelity) connection with terminal A; and it is certain that specific configuration in the relative angle can also be defined, while the defined configuration has its own configuration IDConfig.

After terminal A chooses the relative angle mode, terminal A will launch the NFC and the triaxial gravity sensor;

when terminal A and terminal B perform NFC communication in a certain angle, terminal A transfers the angle and configuration information thereof to terminal B in the process of NFC contact;

after receiving the angle and configuration information thereof, terminal B first determines the configuration version information. If the configuration files are the same, the relative direction of terminals A and B is further determined according to the angle information that is transferred by A and the angle information of its own. When it is determined that terminals A and B relatively superpose, an instruction will be determined and executed to share the "Share" folder to terminal A; and when terminals A and B relatively cross, an instruction will be determined and executed to establish wifi-direct connection with terminal A;

if the configuration files are different, terminal B completes subsequent processing according to the configuration information transferred by terminal A after completing angle determination, and the processing modes thereof are identical and will not be described again here.

It is certain that specific configuration information are different from one another and will not be illustrated here.

It is certainly to be understood that in an example embodiment of the disclosure, when communication is performed based on the RFID, the transferred data needs to be encapsulated according to a protocol corresponding to the RFID, which belongs to the scope of the related art and will not be described here.

Figure 5:
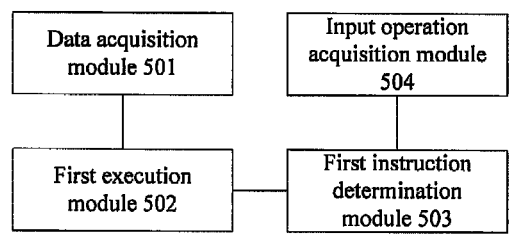
FIG. 5 is a schematic diagram showing the structure of an interactive processing device according to an embodiment of the disclosure.

The embodiments of the disclosure further provide an interactive processing device used in a first electronic apparatus that supports RFID transmission. As shown in FIG. 5, the interactive processing device includes:

a data acquisition module 501 configured to obtain data to be processed from a peer communication node through the RFID technology;

an input operation acquisition module 504 configured to obtain a first input operation input by a user through an input device;

a first instruction determination module 503 configured to determine a first control instruction corresponding to the first input operation according to a pre-defined first corresponding relation that records a plurality of input operations and corresponding control instructions; and a first execution module 502 configured to execute the first control instruction and control the first electronic apparatus to process the data to be processed.

In the above-mentioned interactive processing device, the peer communication node is a second electronic apparatus that supports RFID transmission or an RFID label.

In the above-mentioned interactive processing device, when the peer communication node is a second electronic apparatus that supports RFID transmission, the above-mentioned first input operation includes:

an input operation input by the user through an input device on the first electronic apparatus; and/or an input operation input by the user through an input device on the second electronic apparatus and received from the second electronic apparatus through the RFID technology.

In the above-mentioned interactive processing device, when the first input operation is the input operation input by the user through the input device on the second electronic apparatus and received from the second electronic apparatus through the RFID technology, the above-mentioned first corresponding relation is a corresponding relation received from the second electronic apparatus through the RFID technology.

The embodiments of the disclosure further provide a first electronic apparatus that supports RFID transmission, and the first electronic apparatus includes the above-mentioned interactive processing device.

Figure 6:
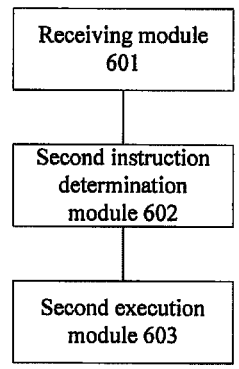
FIG. 6 is a schematic diagram showing the structure of the interactive processing device according to another embodiment of the disclosure.

The embodiments of the disclosure further provide an interactive processing device used in a third electronic apparatus that supports RFID transmission. As shown in FIG. 6, the interactive processing device includes:

a receiving module 601 configured to receive a second input operation from a fourth electronic apparatus through the RFID technology, wherein the second input operation is an input operation input by a user through an input device on the fourth electronic apparatus;

a second instruction determination module 602 configured to determine a second control instruction corresponding to the second input operation according to a pre-defined second corresponding relation that records a plurality of input operations and corresponding control instructions; and a second execution module 603 configured to execute the second control instruction and control the third electronic apparatus.

The above-mentioned second corresponding relation is a corresponding relation received from the second electronic apparatus through the RFID technology.

The embodiments of the disclosure further provide a third electronic apparatus that supports RFID transmission. The third electronic apparatus includes the above-mentioned interactive processing device.

What is described above is an implementation of the disclosure. It is to be noted that a person skilled in the art may make several improvements and polishment without departing from the principle of the disclosure, and these improvements and polishment should also be regarded as being within the scope of protection as defined by the appended claims of the disclosure.

What is claimed is:

1. An interactive processing method used in a first electronic apparatus that supports radio frequency identification (RFID) transmission, wherein the method comprises:

obtaining, by the first electronic apparatus, data to be processed from a peer communication node through an RFID technology;

obtaining a first input operation input by a user through an input device, wherein the first input operation is a relative angle or an absolute angle of the first electronic apparatus;

determining a first control instruction corresponding to the first input operation according to a pre-defined first corresponding relation that records a plurality of input operations and corresponding control instructions; and executing the first control instruction, and controlling the first electronic apparatus to process the data to be processed;

wherein executing the first control instruction and controlling the first electronic apparatus to process the data to be processed comprises:

the first electronic apparatus shares a folder in the root directory of the first electronic apparatus to the peer communication node, or establishes a wifi-direct connection with the peer communication node.

2. The interactive processing method according to claim 1, wherein the peer communication node is a second electronic apparatus that supports RFID transmission or an RFID label.

3. The interactive processing method according to claim 2, wherein when the peer communication node is the second electronic apparatus that supports RFID transmission, the first input operation comprises:

an input operation input by the user through an input device on the first electronic apparatus; and/or an input operation input by the user through an input device on the second electronic apparatus and received from the second electronic apparatus through the RFID technology.

4. The interactive processing method according to claim 3, wherein when the first input operation is the input operation input by the user through the input device on the second electronic apparatus and received from the second electronic apparatus through the RFID technology, the first corresponding relation is a corresponding relation received from the second electronic apparatus through the RFID technology.

5. An interactive processing method used in a third electronic apparatus that supports radio frequency identification (RFID) transmission, wherein the method comprises:

receiving, by the third electronic apparatus, a second input operation from a fourth electronic apparatus through an RFID technology, wherein the second input operation is an input operation input by a user through an input device on the fourth electronic apparatus, and the second input operation is a relative angle or an absolute angle of the fourth electronic apparatus;

determining a second control instruction corresponding to the second input operation according to a pre-defined second corresponding relation that records a plurality of input operations and corresponding control instructions; and executing the second control instruction, and controlling the third electronic apparatus;

wherein executing the second control instruction and controlling the third electronic apparatus:

the third electronic apparatus shares a folder in the root directory of the third electronic apparatus to the fourth electronic apparatus, or establishes a wifi-direct connection with the fourth electronic apparatus.

6. The interactive processing method according to claim 5, wherein the second corresponding relation is a corresponding relation received from the fourth electronic apparatus through the RFID technology.

7. An interactive processing device used in a first electronic apparatus that supports radio frequency identification (RFID) transmission, wherein the device comprises:

a data acquisition module configured to obtain data to be processed from a peer communication node through an RFID technology;

an input operation acquisition module configured to obtain a first input operation input by a user through an input device, wherein the first input operation is a relative angle or an absolute angle of the first electronic apparatus;

a first instruction determination module configured to determine a first control instruction corresponding to the first input operation according to a pre-defined first corresponding relation that records a plurality of input operations and corresponding control instructions; and a first execution module configured to execute the first control instruction and control the first electronic apparatus to process the data to be processed;

wherein a first execution module configured to execute the first control instruction and control the first electronic apparatus to process the data to be processed comprises:

the first execution module shares a folder in the root directory of the first electronic apparatus to the peer communication node, or establishes a wifi-direct connection with the peer communication node.

8. The interactive processing device according to claim 7, wherein the peer communication node is a second electronic apparatus that supports RFID transmission or an RFID label.

9. The interactive processing device according to claim 7, wherein when the peer communication node is the second electronic apparatus that supports RFID transmission, the first input operation comprises:

an input operation input by the user through an input device on the first electronic apparatus; and/or an input operation input by the user through an input device on the second electronic apparatus and received from the second electronic apparatus through the RFID technology.

10. The interactive processing device according to claim 9, wherein when the first input operation is the input operation input by the user through the input device on the second electronic apparatus and received from the second electronic apparatus through the RFID technology, the first corresponding relation is a corresponding relation received from the second electronic apparatus through the RFID technology.

11. A first electronic apparatus that supports radio frequency identification (RFID) transmission, comprising the interactive processing device of claim 7.

12. An interactive processing device used in a third electronic apparatus that supports radio frequency identification (RFID) transmission, wherein the device comprises:

a receiving module configured to receive a second input operation from a fourth electronic apparatus through an RFID technology, wherein the second input operation is an input operation input by a user through an input device on the fourth electronic apparatus, and the second input operation is a relative angle or an absolute angle of the fourth electronic apparatus;

a second instruction determination module configured to determine a second control instruction corresponding to the second input operation according to a pre-defined second corresponding relation that records a plurality of input operations and corresponding control instructions; and a second execution module configured to execute the second control instruction and control the third electronic apparatus;

wherein the second execution module configured to execute the second control instruction and control the third electronic apparatus comprises:

second execution module shares a folder in the root directory of the third electronic apparatus to the fourth electronic apparatus, or establishes a wifi-direct connection with the fourth electronic apparatus.

13. The interactive processing device according to claim 12, wherein the second corresponding relation is a corresponding relation received from the fourth electronic apparatus through the RFID technology.

14. A third electronic apparatus that supports radio frequency identification (RFID) transmission, comprising the interactive processing device of claim 12.

15. A first electronic apparatus that supports radio frequency identification (RFID) transmission, comprising the interactive processing device of claim 8.

16. A first electronic apparatus that supports radio frequency identification (RFID) transmission, comprising the interactive processing device of claim 9.

17. A first electronic apparatus that supports radio frequency identification (RFID) transmission, comprising the interactive processing device of claim 10.

18. A third electronic apparatus that supports radio frequency identification (RFID) transmission, comprising the interactive processing device of claim 13.

* * * * *